6584X
S. Hurlbut.
Forming Bats.
Patented Jun. 13, 1831.
No.
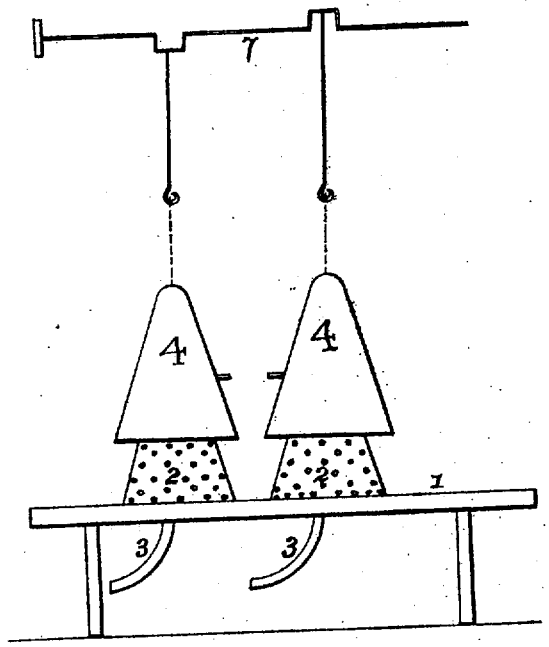
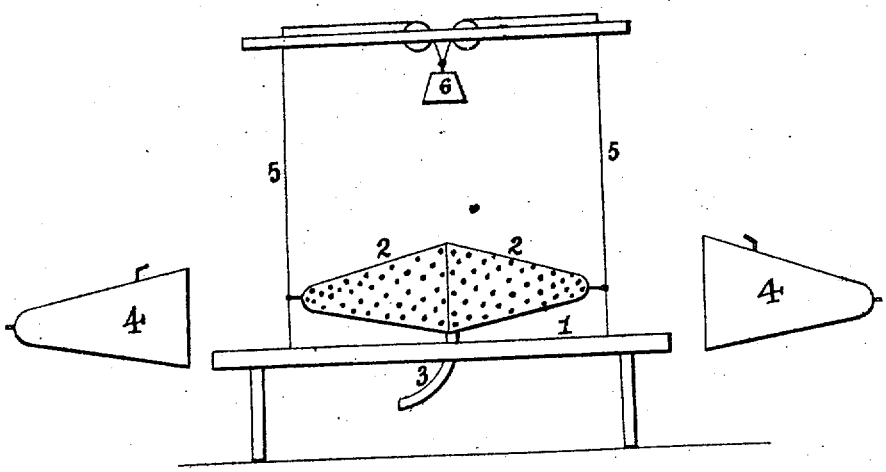

June 13. 1831 997.

Stephen Hurlbut 6584X

Letters Patent

The schedule referred to in these Letters Patent and making part of the same containing a description in the words of the said Stephen Hurlbut himself of his improvement in the manufacture of hats by hardening the body on the cone.

---

To all to whom these presents shall come Be it known that I Stephen Hurlbut of Glastenbury in the County of Hartford and State of Connecticut have invented a new and useful improvement in the manufacturing of hats by hardening the body on a cone and that the following is a full and exact description of the construction and operation of the said machine as invented or improved by me. My claim is for admitting steam into the cone on which hat bodies are formed also for covering the cone with a cap or shell. The cone (No 2) on which the hat body is formed is perforated with holes, when the [illegible] which constitutes the body is wound upon the cone it is covered with a cloth and over the whole is put the cap (No 4) It is then taken to the bench (No 1) and placed directly on the steam pipe (No 3) and the cap (No 4) is set in motion by the crank No 7. This process will harden the hat body Stephen Hurlbut Witnesses Sam. Welles Gideon Welles

C.H.W.